Figure 1:
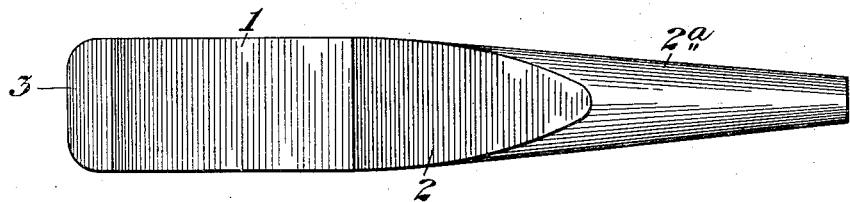

P. C. HEWITT.
APPARATUS FOR TRAVERSING WATER OR OTHER FLUID MEDIUMS.
APPLICATION FILED OCT. 21, 1905. RENEWED OCT. 17, 1912.

1,088,226.

Patented Feb. 24, 1914.

3 SHEETS—SHEET 1.

Fig. 3ª

Witnesses
Chas. F. Clagett
A. G. Stage

Peter Cooper Hewitt Inventor
By his Attorney
G. C. Dean

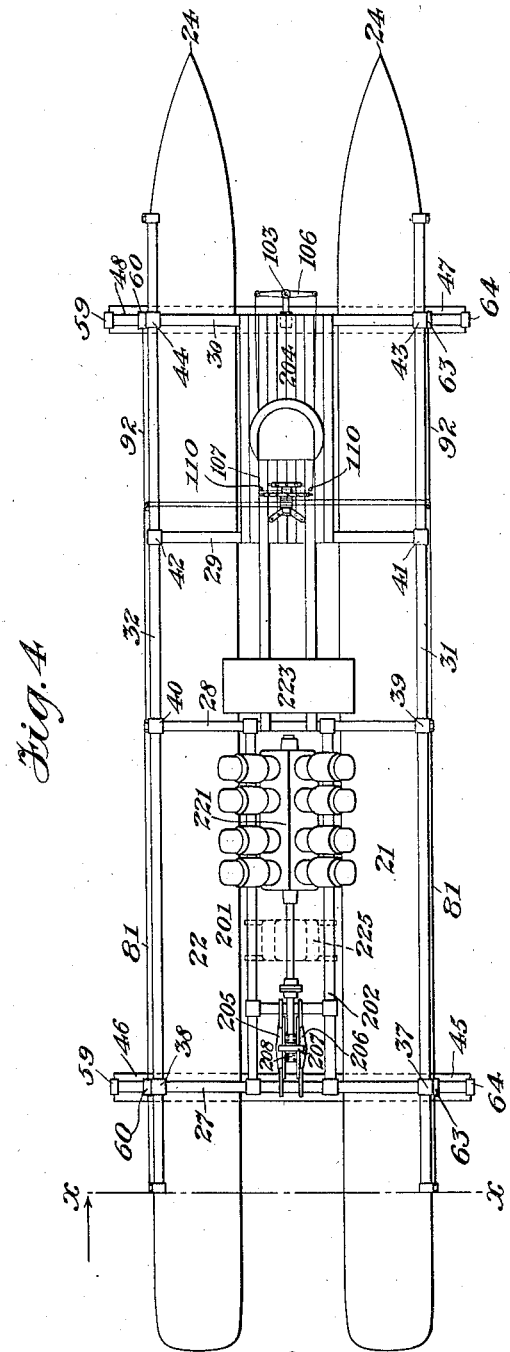

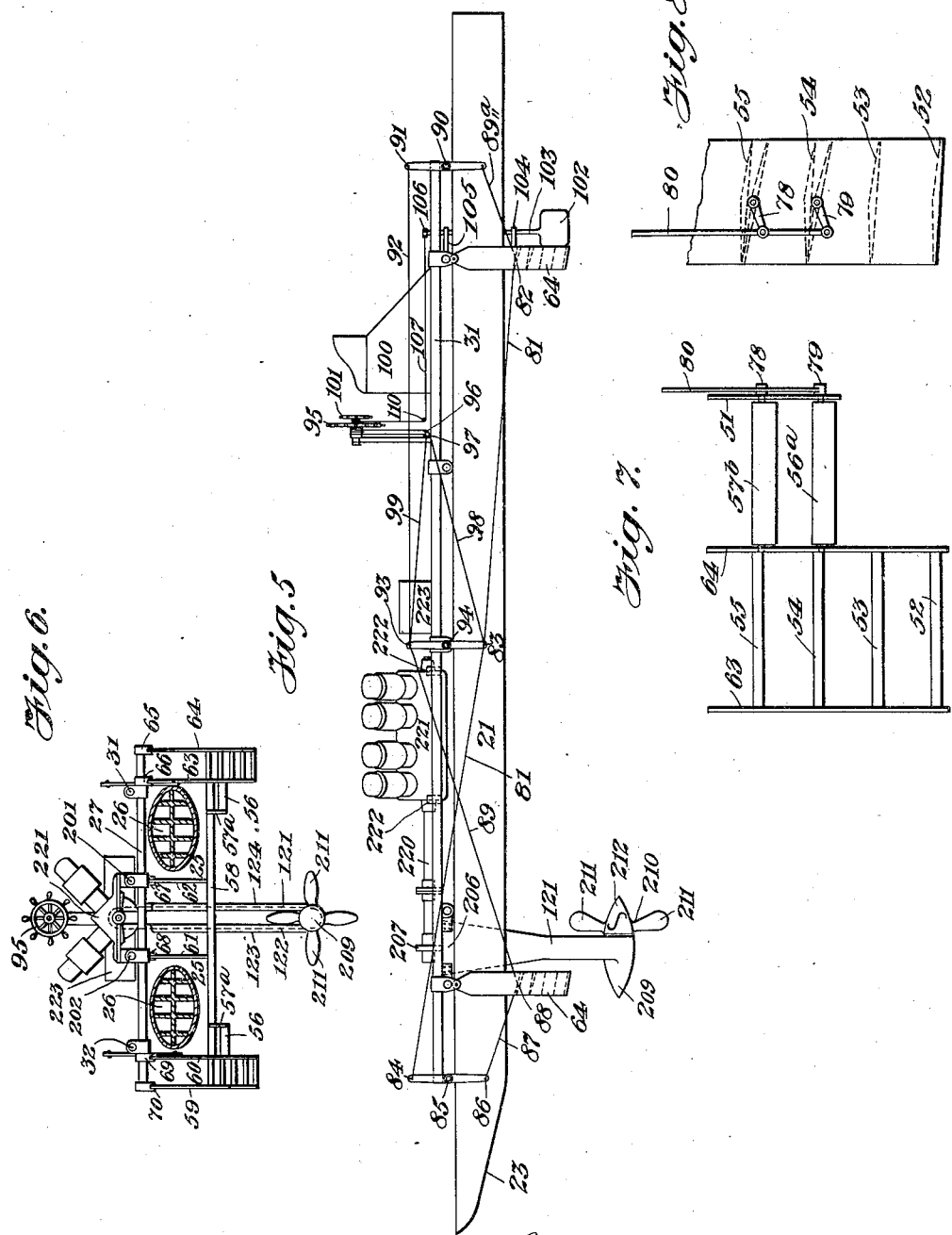

UNITED STATES PATENT OFFICE.

PETER COOPER HEWITT, OF NEW YORK, N. Y.

APPARATUS FOR TRAVERSING WATER OR OTHER FLUID MEDIUMS.

1,088,226.   Specification of Letters Patent.   Patented Feb. 24, 1914.

Original application filed August 11, 1905, Serial No. 273,724. Divided and this application filed October 21, 1905, Serial No. 283,730. Renewed October 17, 1912. Serial No. 726,399.

*To all whom it may concern:*

Be it known that I, PETER COOPER HEWITT, a citizen of the United States, and resident of the city of New York, in the county of New York and State of New York, have invented certain new and useful Improvements in Apparatus for Traversing Water or other Fluid Media, of which the following is a specification.

My object has been to produce a very fast boat, and in pursuit of this object I have invented a radically new type of motor boat operating upon radically new principles and I have also invented many features and improvements applicable to all kinds of devices for traversing fluid media and their support therein, particularly to water craft, motor boats, air vehicles and motors.

At the present time water craft are supported in the water by the extremely primitive and indeed prehistoric method of flotation or static displacement of a volume of water as by wood or cork by a water tight vessel. This method is very effective for securing the required support or flotation but it imposes very rigid limitations upon all efforts to attain on water the speeds which are easily attainable on land and in the air. The movement of a vessel is through the water and such movement involves displacement of the water in front and filling in behind. At slow speeds, that is extremely easy and economical because the slow forward movement of the vessel requires only the slowest movements of the water in flowing out of the way in front and filling in, in the rear and the internal friction of the water and skin friction of the same upon the hull of the vessel are extremely small. With increased speeds, however, the water must move out of the way with increased velocities and the friction is increased, the losses from both these factors increasing with the square of the velocity. Much energy is also wasted in imparting unnecessary velocities to the water in useless directions and in various useless waves, eddies and whirls. Thus the opposition to increased speed increases in very much higher ratio than the speed and at high speeds varies about as the cube of the speed. To drive a 20 knot boat 40 knots requires eight times the horse power according to this rule and in practice it would require more than this. Considering the enormous horse power and weight of machinery required to drive any boat however well designed at 20 knots an hour, it is easy to understand that in a 40 knot boat more than eight times as powerful the limit for boats depending on hydrostatic displacement for flotation has been nearly reached already with the present means of power and design.

For my purpose all that has been or may be done by others and all the inventions made by me relating to lightness and efficiency of structure and of motor power are of greatest importance to the principal invention of this application but all conventional refinements in the shape of flotation bodies involving the law of cubes are nonessential and are involved if at all only in a subordinate relation.

According to the present practice of flotation by hydrostatic pressure upon a displacement body of hull and particularly in the modern motor boats and so-called automobile boats, the refinements in the shape of the hull have resulted in making the bow or rather all that part of the vessel forward of the greatest cross section of displacement, in a form having the characteristics of a more or less modified wedge or cone. The speeds attained have been such that the lateral component of the wedging action has operated to displace an unnecessarily large volume of water at unnecessary velocities and in unnecessary directions. The vertical component has operated to lift the bow and depress the stern so that even in boats of extreme length and small cross section the keel becomes in effect the cut water, the boat traveling at an inclination with the stern water level far below the bow water level.

With this as a basis one of my principal inventions may be roughly and perhaps not inaccurately described as consisting in utilizing this vertical wedging action by forcing the displacement body or vessel to such high speed as to drive it up the incline and out of the depression practically lifting it out of the water and reducing the hydrostatic displacement to practically nothing. I thus effect practically substitution of hydrodynamic for hydrostatic displacement or flotation. It will be obvious that by hydrodynamic displacement I mean the lifting power of planes or similar surfaces driven rapidly through or over the water or through the air and tilted upwardly at a slight angle to their direction of movement. This lifting effect has a homely embodiment and illustration in the "skipping" of a flat stone skilfully thrown over the surface of the water, or the sailing of such a stone when similarly thrown in the air; or the support of a marine toboggan which glides swiftly over the water under momentum acquired on the slide, until the speed becomes sufficient for hydrodynamic or gliding plane support. While this principle may be very advantageously applied in the construction of the hull of an ordinary motor boat, it will be found in general that the best arrangement of gliding or wedging surfaces or planes is such as cannot be attained in greatest perfection in the shape of the surface of the hull itself. One of the particularly important reasons for this is that at high speeds even such speeds as are now ordinarily attained by motor boats, the wetted surface of the hull necessary for hydrostatic flotation is enormously great as compared with the surface of a plane or planes necessary to support or float such structure hydrodynamically. This is very important because by my principle I may attain speeds heretofore unknown and considered impossible and whereof the limits are those of materials and personal safety rather than the heretofore recognized limit imposed by the rule of the cube of velocity. At such speeds the frictional resistance, initially small but increasing with the square of the velocity, becomes a very important fraction of the total energy expenditure and decrease of the wetted surface from that of an ordinary hydrostatic flotation hull to that of a few square feet of gliding or wedging planes, involves a very considerable saving of power. Another important reason is that by making the planes independent of the hull, part or all of them may be fixed far enough down in the water to always act upon an undisturbed solidly resisting region thereof instead of on the surface. They may be arranged at different depths so that as they become more effective per unit of surface by reason of increase of speed, and the whole structure is thus lifted higher, some of them may rise above the surface of the water one after the other so that the frictional losses tend to remain nearer a constant for all speeds. The lifting efficiency of the planes increases as the square of the speed and the frictional losses also increase as the square, so that as the flotation or supporting power and frictional loss per unit surface increase, the surface exposed decreases. Thus the speed may be made to increase directly with all increase in applied power, only in somewhat less than direct proportions. This arrangement whereby a boat's speed increases almost directly with increase in applied power instead of only as the cube root of the increase involves a radical departure in this art.

Another advantage is that the flotation planes may be made adjustable in angle of inclination to the water either separately or simultaneously to secure the desired lift or flotation effect for any desired speed, the inclination being less at higher speeds. Another advantage is it facilitates the designing, proportioning and distribution of the planes and the independent arrangement and adjustment thereof to suit all conditions. For instance, it makes it possible to arrange them to fold up so as to decrease their area or to feather or to automatically change their angle in a multiplicity of ways and directions which would be difficult and in many cases prohibited by the comparative inflexibility which results when they are made part of the surface of the hull of the boat. I prefer therefore to employ auxiliary supporting or gliding planes, preferably submerged below the hull. There may be one, two, three or four or more of these planes or sets of planes. Where one plane is employed it may be the surface of the hull of the boat as I have stated; and this may be especially designed for the purpose or the surface of the hull of the boat may furnish one or more of the wedging surfaces or planes and one or more auxiliary separate planes to be used in conjunction therewith. I prefer, however, to rely on the hull of the boat for flotation only while at rest or at low speeds and to rely entirely on the separate auxiliary planes or sets of planes for support or flotation when at normal speed, the hull being lifted preferably entirely out of the water. The great variety of geometrical arrangements which may be devised for effecting this will be readily understood.

Among the most obvious arrangements are the triangular arrangement of 3 planes or sets of planes, 2 on each side and one amidships either forward or aft. There are also numerous arrangements of four, as for instance, two forward and two aft at equal distance on each side of the boat; or 2 main supporting planes forward and aft on the center of flotation with 2 more at the sides or aft, acting as auxiliaries to prevent listing, careening, etc.

When the planes are arranged at different vertical heights it is desirable to have the lowermost ones of such size and angle that they are not quite sufficient to support the structure at the highest speed required so that the principal work will be done by planes submerged and not subject to ordinary surface disturbances. With such an arrangement the next higher sets of planes will furnish the additional flotation required. There may be one or more of these higher level auxiliary planes and they may be comparatively small and therefore easy to manipulate by change of position or by change of angle in various ways. They may be arranged to press automatically on the surface of the water and may be spring-pressed and may be made so as to change the angle at which their surfaces are presented to the water to compensate for variations in loads and for other reasons.

The variation of the angle of any of the planes may be by mechanical adjustment which may be automatic if desired either for preserving or maintaining a desired angle or for presenting an extent or angle of surface which can be adjusted or varied automatically for any special load or conditions. In order that it may be easily operated the plane may be pivoted at or near the middle to give a balancing effect and the angle can be maintained mechanically or automatically with respect to the level of the boat, the water level or the force of gravity.

When the planes are at a very small angle, the bow of the boat may be fashioned after the manner of a scow or a separate auxiliary plane, or several of them, may be arranged above and at a considerably greater angle to the water than are other planes. They may be arranged to be normally above the water at ordinary full speed and to become operative upon any tendency to dive, which might be brought about by depression of the bow or lift of the stern by waves or other disturbances. These may change the level sufficiently to cause planes that are already nearly horizontal to slant downwardly and hence act dynamically to cause the boat to dive. When this happens the steep angle planes will strike the water and very speedily correct the trouble. This purpose may also be served by planes that are normally submerged and are brought into action automatically or by hand. Similar auxiliary planes or surfaces may be used to exert a lateral wedging action to prevent or guard against tendency to lateral diving, careening or turning turtle.

The work of any of the auxiliary planes especially those that are intended to act at or near the surface and particularly those that are normally above the surface may be performed in part or whole by the hull or static flotation means or by surfaces suitably formed thereon or projecting therefrom and separate adjustable or fixed flotation bodies with or without the dynamic lifting surfaces may be applied. For instance, such a body arranged after the manner of an outrigger on a Malay proa might be very useful in some relations.

From the above it will be seen that I utilize the surface of the water as a guiding surface though only in a general way. At high speed the momentum of even the lightest craft is large, increasing with increase of the speed and for this reason and also because of the rapidity of movement over the water the effective guiding surface will be the average or mean of the waves or undulations and unless these are great compared to the dimensions of the craft it will have a predominant tendency to travel in a single horizontal plane and in a straight line.

Vertical planes may be arranged in exact parallelism with the direction of movement of the craft, to prevent yawing, slewing, careening or making leeway and these may be extensions or keels of the flotation means or may be separately mounted forward and aft. They are usually of small area because the great speed attained makes them very effective. Their function is usually sufficiently served by the plane surfaces of uprights or thrust members connecting the hull with the submerged planes, the propeller or the rudder or by the rudder itself.

Horizontal planes exactly parallel with the plane of desired forward movement of the boat may also be employed if desired to modify or prevent rising and falling movement or changes or angle of structure and these may be at or above the surface or may be deply submerged out of the reach of surface disturbances. Such a surface may be arranged after the manner of driving rudders of submarine boats to be adjusted to meet emergencies.

Having described in a general way the nature and objects of my invention, which is a division of my application Serial No. 273,724, filed August 11, 1905, I will proceed to describe the same more in detail in connection with certain apparatus which I have devised for practice thereof and which I have shown in the accompanying drawings wherein—

Figure 2:
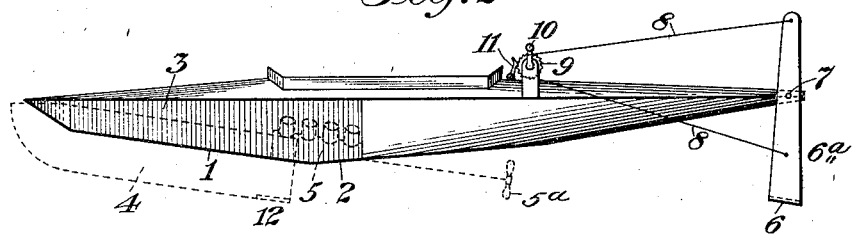
Figure 3:
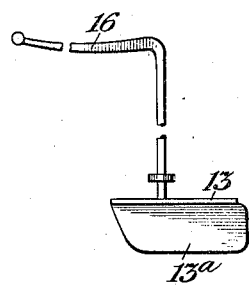
Figure 3:
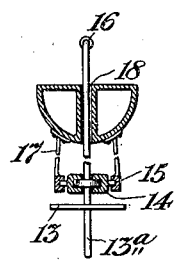

Figure 1 is a bottom plan view and Fig. 2 a side elevation of a hull or vessel particularly adapted for the practice of my invention. Figs. 3 and 3ª are details of a combined steering and diving rudder which may be used in connection therewith. Figs. 4, 5, 6, 7 and 8 are respectively top plan, side elevation, elevation partly in section, and details of a desirable form of craft wherein the hydrostatic supporting means and displacement hulls are adapted to be lifted entirely out of the water by the hydrodynamic wedging action of the gliding planes when the craft is at speed.

It will be understood that though I fully and accurately show and describe an apparatus in complete concrete form ready for actual use, the invention is nevertheless a broad one and my claims are not limited to any specific features not specifically included therein.

In Figs. 1 and 2 I show a specific form of the hull adapted to be driven out of the displacement depression in the water and to glide on the plane surfaces of its bottom. To this end all the forward part of the boat has parallel sides 3 and these are preferably vertical. The bottom comprises angular wedge surfaces 1 and 2 which are formed on straight parallel transverse lines and in their simplest forms are inclined planes. A similar surface 3 at the bow is arranged at a steeper angle to act in emergency to prevent diving. Great latitude is permissible in the pitch and proportions of these plans, but in general this part of the boat should be more or less closely following the old-fashioned scow insomuch as the greatest cross section should be at or forward of the water line of the boat when at high speed. The after part of the boat may converge upwardly and laterally on the lines of a cone or otherwise, at $2^a$. In the form shown all resistance to forward displacement acts vertically and there is no lateral displacement except such as is transmitted hydrostatically by the water which is displaced downwardly and this is an important feature of the construction which cannot be greatly departed from although a hull formed to have some lateral wedging action may be capable of operation in accordance with my invention especially if the shape be such that at speed the laterally wedging portions are lifted out of the water.

As I have stated, a boat like that shown having all its wedging action vertical may nevertheless generate a laterally spreading bow wave by reason of the hydrostatic transfer of pressure from vertical to lateral. To minimize this, I have contemplated arranging vertical exactly parallel thin plates on each side of the hull to assist in preventing such lateral spread of the bow wave and to force all displacement movement in a downward direction. These are shown in dotted lines on Fig. 2 and are indicated by the numeral 4. Indicated in dotted lines at 5 is an 8 cylinder explosive motor having four cylinders on one side and four on the other, 90° therefrom, weighing in all about 500 pounds and developing 100 horse power, all of which will be referred to more in detail hereinafter. $5^a$ is the propeller which may be mounted on the crank shaft as shown or may be arranged in suitable supports below the hull and driven by suitable gearing also as is hereinafter more fully explained. Such a boat properly designed and loaded will float at rest on the planes 1, 2. As the speed is increased the bow will be raised somewhat and the plane 2 will become upwardly inclined instead of downwardly inclined as shown, but if the plane 2 or its equivalent extends far back of the center of gravity as it does with the motor in the position shown the load will be carried largely on these two planes and the arrangement is such that no lateral wedging surfaces come into play at any time. After a certain critical high speed has been attained the tendency of the bow to lift will reach a limit, the hull will come out on the surface and the planes 1, 2, will act as gliding surfaces supporting the load almost entirely hydrodynamically.

The planes 1, 2, may be a single plane flat surface instead of two planes meeting at an angle as shown. The latter arrangement is a compromise which may be used in connection with a submerged adjustable inclined plane 6, mounted in parallel supporting members $6^a$ pivoted to the hull at 7 and angularly adjustable to vary the pitch of the plane by means of steel wires or cords 8 passing around drum 9 which may be rotated by means of a wheel 10 and held in any desired position of adjustment by a dog or ratchet 11. With this arrangement at high speeds the level of the boat and the presentation of the plane or planes 1, 2, to the water may be regulated by regulating the lift of the stern by adjusting the angle of the supporting plane 6. Thus at extreme high speeds the boat will be supported on a portion of the plane 1 resting on the water and by the stern plane 6 alone. The forward support will be upon a portion corresponding to what would be a characteristic bow wave were it not for the lateral plates 4 and the downwardly deflected water, forming what in other craft is the depressed portion of the wake, will clear part or all of the plane 2, leaving the plane 1 as the main supporting surface and plane 6 as an auxiliary and both of them acting hydrodynamically. At lesser speeds there will be more of the hydrostatic component and the surface 2 may remain in contact with the water but in all cases at the critical high speed the support will become mainly dynamic and the speed may be increased in approximately direct proportion with the applied power instead of as the cube root.

It will be noted that at high speeds only a very small portion of the plane 1 need be in contact with the water because its lifting power will vary as the square of the speed and as the sine of the angle. As the only function of this small surface is that of hydrodynamic or gliding support it is evident that there would be many advantages in having it act well beneath the surface in solidly resisting water under considerable hydrostatic pressure instead of in the froth and ripples and waves of the surface. For this reason a submerged plane 12 parallel with 1 may be secured to the plates 4, 4, as shown in Fig. 2. With such an arrangement the boat may be made to travel at extreme high speed with the hull nearly or entirely out of water most of the weight being supported on 12 and the rest of it on 6. The function of the plane 6 may be served by a horizontal plane 13 secured to the rudder 13ª which may be turned on its vertical axis in the collar 14 and the collar 14 being mounted on gimbals 15, this axis may be tilted in either direction by means of the tiller 16. The gimbals are supported on suitable brackets 17 and the pivotal movement of the axis is limited to a fore and aft plane by means of a fore and aft slot 18. This rudder may be used as a supplement to the plane 6 and in this case the angle of the plane 6 may be fixed and the adjusting means omitted. The addition of the plane 12 to this scow shaped hull brings in an element of simplification for such plane independent of the surface of the hull has all of the manifold advantages and possibilities of variation hereinbefore fully set forth. The necessity of very careful elimination of all lateral wedging surfaces on the hull disappears, since with any modern high speed motor boat or automobile launch hulls and with the horse power available in my engine a speed of more than 20 knots is attainable and at such attainable speeds a plane or planes arranged as shown at 12 will be sufficient to lift the hull entirely out of water. This marks the complete substitution of hydrodynamic for hydrostatic flotation which is characteristic of my invention when practised in greatest perfection. I prefer, however, a catamaran arrangement of two hulls supporting a rectangular frame work carrying the motor between the hulls and having secured thereto supports in four sets, forward and aft and on each side carrying submerged and auxiliary planes adapted at high speed, to furnish a four point gliding plane support for the entire structure.

It is obvious that 2, 3 or 4 hulls may be used as a catamaran or in a triangle or in a quadrilateral each provided with its own gliding planes and all connected by a frame work and the propulsion may be by 1 or by several motors. The separation of these hulls may be so wide as to make possible carrying an enormous sail area capable of use as an auxiliary or the sails may be for limited times in an extreme type of construction and with considerable wind be capable of driving the craft with sufficient speed to partially or wholly substitute the hydrodynamic for the hydrostatic support. It will be obvious also that the lifting of the hydrostatic supporting hull, clear of the water, may be initiated or maintained in whole or in part by propellers arranged vertically or directed rearwardly at a desired angle to the vertical. For instance a single propeller thus arranged may be substituted for the auxiliary plane 6 used in conjunction with the plane surface 1 of Fig. 2.

Referring now to Fig. 4 and Fig. 5 it will be seen that the two parallel hulls, 21, 22, forming the catamaran are practically parallel sided, flattened cylinders cut away forward to form scow-like bows, 23, 23, and converging laterally at the stern to sharp vertical stern posts, 24, 24. Although their shape may be variously modified for special uses without affecting my invention. These flotation hulls are practically a dead weight at full speed since they are then carried by the supporting planes. They are therefore made as light as possible but they must nevertheless have considerable strength and rigidity to withstand the strains of unequal supports in the waves at low speed and the highest strains of shock due to impact of waves or to suddenly coming in contact with the water at high speeds. For this reason they may be longitudinally corrugated or ribbed at 25 and are internally trussed and braced as shown at 26 in Fig. 6. They are preferably flattened as shown so as to decrease the height to which it is necessary to lift them in order to have them substantially clear the surface of the water. Being of great strength they may be used instead of the longitudinal members 31, 32. I have shown these hulls with the scow model of bow and with straight sides because it is desirable to minimize the lateral wedging action of displacement at speeds where the hulls act as the flotation means and to have all displacement as far as possible downwardly directed. I contemplate however, using any desired or known form of high speed catamaran hulls or construction including arrangements wherein adjacent sides of the two hulls are exactly vertical, exactly parallel planes and the outer sides and bows or both affording more or less surface adapted to displace or wedge the water laterally or to pierce through it. Indeed for some reasons it is desirable to design the displacement bodies solely with reference to high speed of hull through the water in order to reach the speeds where the planes become more efficient as supporting means and then at such higher speed substitute the gliding plane support exclusively for the hydrostatic support. Such expedient has the advantage that troublesome compromises of design to adapt the hull for high speed through the water and also to provide it with inclined plane gliding surfaces for movement over the water, are dispensed with and the hull may be designed for the sole purpose of speed through the water in ordinary hydrostatic supporting relation, while the planes are designed to take care of the gliding or hydrodynamic support.

The hulls in the form shown may be prevented from "squatting" at the stern and thus presenting the rounded bottom in the direction of the advance thereby causing it to act for lateral displacement, by the design or adjustment of the submerged planes whereby the horizontal position of the hulls will be maintained for all speed up to that at which they are lifted entirely out of the water. In lieu of this they may be made flat bottom of even longitudinally concave on the bottom and the sides may be vertical planes.

The hulls are held in parallel relation or where desired in any angular relation of least resistance, by any suitable framework adapted for the purpose or known in the art and the connection between the framework or hull may be any suitable or known connection for such purpose though I prefer for my purposes that the connection be rigid so as to prevent independent movements of any part of the structure or flexibility of any of the joints. Flexible joints may be of advantage in certain connections.

The connecting framework or platform which I have shown consists of transverse members 27, 28, 29 and 30 and longitudinal members 31 and 32. These are preferably steel tubes of such diameter and thickness of walls as will give the required rigidity and strength. The transverse members 27 and 30 are connected to the hull in any desired manner and it is desirable that the connection be made to saddles or yokes on the latter arranged to distribute pressure and strain over a considerable circumference or area of the same. The longitudinal members 31 and 32 are preferably integral or single pieces of tubing from end to end and for purposes of strength and convenience in construction are secured laterally to the transverse members 27 and 30 by stirrups or collars 37, 38, 43, and 44 clamped or brazed thereto or otherwise secured by suitable means not requiring screw threading, cutting or otherwise impairing their form and strength. Intermediate transverse members, 28, 29 are similarly secured to the longitudinal tubing by stirrups or clamping collars 39, 40, 41, and 42 and they may or may not be secured to the hull after the manner of tubes 27 and 30. The rigidity of this platform may be increased by adding one or more transverse thrust members at or about the center thereof, as for instance a vertically arranged tube at the center of 28, and connecting diagonally opposite points of the framework by steel wires or ropes in the plane of and passing over the ends of said thrust member.

The transverse tubes 27 and 30 are extended beyond the sides of the boat and on the outboard portion thereof are secured four sets of supporting gliding planes, consisting of forward sets 45, 46 and rear sets 47, 48. The thrust members 59, 60, 63 and 64 are plates having their adjacent or inner surfaces parallel and any thickening for the purpose of longitudinal strength is in the form of a convexity on the outer side of each so that whatever wedging action there is in a lateral direction will be toward open water and will not result in having adjacent wedge surfaces acting toward each other. These plates are secured pivotally at 70, 69, 66 and 65 respectively and they are the means of supporting the inclined gliding planes, 52, 53, 54 and 55. These latter which are one over another are preferably all at the same angle because thus arranged they form parallel sided, open ended boxes of uniform cross section so that the water passes through them freely without the impediment or drag which would result if adjacent planes were at different angles so that the box or passage would be of non-uniform cross section. These planes are preferably true planes or else slightly concave and as shown in Fig. 8 any thickening at the center for purposes of longitudinal rigidity should be on the back side thereof. In some relations fewer planes of larger area might be used and some of them may be arranged to one side which is preferable when the planes are at different angles instead of vertically one over the other after the manner of the planes 56, 57, in fact a set of planes might consist of a single large plane 52, of proportionally greater area in combination with a single plane 56, as will be obvious. I prefer to have the planes arranged, as shown however, for structural reasons and also because thus arranged they may rise out of the water one after the other and thus be thrown out of action as the speed increases.

The arms 60, 63 support a large transverse plane which may be plane faced on the under side and convex on the back to form in effect a girder or truss like element. Additional supports 61, 62 pivoted at 68, 67 may serve to stiffen the same and relieve it from transverse strain. Additional supplemental planes 56, are supported at one end by 60 and 63 respectively and at the other by additional supports or thrust members 57ª, 57ª. The planes 56, 57 and 58 are arranged at a greater angle to have a greater lifting effect than are the others because they are higher and are normally submerged only at the lower speeds at which a required lifting effect can only be got by greater angle or greater surface. Being vertically out of line with 52, 53, etc., they have no opposed wedging action upon the water because the surfaces are not opposed and hence no constricted passage is formed. These planes 56, 57 also act as a guard to prevent any tendency to diving at high speed and may be so located as to come into operation for this purpose either simultaneously with or before the scow surfaces 23 touch the water. The rear sets of planes 47 and 48 are similar to the forward set 45 and 46 though the steep angle guard planes to prevent diving are not so necessary. Any or all of the planes particularly the guard planes either front or rear may be balanced on pivots and adjustable in inclination by means of crank arm 78 and 79 adjusted from above in any desired manner by means of the vertical rods 80. In the particular arrangement shown in Fig. 7, pivoted planes $56^a$, $57^b$ are mounted outside of 64 on a third similarly pivoted arm 51.

In the above described arrangement there is found a nice adaptation of area, angle proportion and disposition of the gliding planes, the significant features of which I will now proceed to point out. In general it may be said that the lifting power of a horizontally gliding plane inclined in the direction of movement varies directly as the area of the plane, as the sine of its angle to the horizontal, as the density of the medium and as the square of the velocity of the movement. I have worked this out for water and have verified it by comparison with the results obtained by others. It is to be noted that it has been erroneously laid down by some authorities that the factor of inclination of the plane comes in as the square of the sine of the angle whereas my investigations agree with the conclusions of Lord Rayleigh and substantially with those of Kirchoff, that the variation is directly as the sine and not as the square. This is important to the present invention because here we are dealing with high velocities requiring only small angular inclination of the planes. The sines of such angles are comparatively small fractions and the results got by using the square of the sine as a multiplier instead of the sine, call for far larger areas and much greater inclination of planes than I find to be necessary. The fact that the velocity or speed comes in as the square is important and in connection therewith the concrete facts of my invention with regard to areas and angles of planes horse power, etc., at high speeds, are quite remarkable. For instance I find that at a speed of only twenty miles an hour and with an inclination of only one inch vertical to fourteen inches horizontal, a single square foot of gliding plane surface will support nearly one hundred pounds while at a speed of sixty miles an hour, the same square foot of surface with the same inclination of one in fourteen will support about eight hundred pounds. As the entire catamaran including hulls, frame, motor, fuel, load, &c., constructed as shown and described, weighs only 2000 pounds for a 25 foot craft, it results that four square feet will support the entire structure at 60 miles per hour with 40% left over as a margin or factor of safety and at twenty miles an hour only about twenty-two square feet of surface are necessary. This is about six square feet for each of the four sets of planes or about 1½ square feet for each of the planes 52, 53, 54 and 55 leaving the planes 56, 57 and 58 as extra and unnecessary except for emergencies.

For greater inclinations the planes are of course more effective per square foot for a given speed. For instance at an inclination or angle of 1:5 at 60 miles per hour, a single square foot of gliding surface will support the whole 2000 pounds. This means, for the structure shown in the drawing, that the whole 25 foot structure will be supported above the water by four gliding planes, each 12 inches by 3 inches. It is not to be concluded from this that high angles for the gliding planes are desirable for general purposes, because the fact is that to keep the single square foot, plane inclined 1 to 5, up to the 60 mile speed it takes about twice the horse power required to maintain the same speed and support the same load with the equivalent 3 square feet at the smaller inclination of 1 to 14, and this in spite of the fact that the latter area involves about three times as much frictional loss as the other.

From the theoretical side the problems of proper inclinations, area and distribution of the planes, is a little complex even when the correct formula mentioned above is used. This formula is $$L = SV^2 \sin. aX,$$

where $S$=the surface of the gliding plane, $a$=its angle of inclination to a horizontal plane, $V$=its velocity or speed per second in that plane, and $X$=the density of the medium.

It may be stated that the factor $X$ applies to any fluid medium and the formula may be used to calculate the necessary surfaces and inclinations for supporting planes and propellers to be used for aerial gliding support, which latter become a comparatively simple problem when the surface of the water is used as a guide.

Where water is the medium $X$ may be simplified to $$\frac{64}{32} = 2$$

so that the formula becomes $$L = 2SV^2 \sin. a.$$

For our purposes we may assume as $V$ a speed easily attainable by a modern high speed automobile launch or motor boat, say 20 miles an hour (=about 30 feet per second) in order to find what surfaces and angles or inclination thereof will be capable of lifting its total weight, which as herein set forth may be about 2000 pounds. The formula then becomes:

$$2000 = 2(30)^2 S \sin a$$

or, roughly $$1.1 = S \sin a.$$

This gives directly a set of surface areas and the corresponding inclination at which each area will support 2000 pounds when the speed is 20 miles per hour. A set of areas and corresponding inclination of planes adapted to support the required weight of 2000 pounds may be similarly available for the maximum speed which it is desired to reach, say 60 miles an hour or 88 feet per second, thus:

$$2000 = 2S(88)^2 \sin a$$

$$S \sin a p.13$$

For instance if the inclination or angle selected is 1 to 10 then the surface of the gliding plane required is 1.3 square feet. Such sets of areas and inclinations for given speeds and for a given load do not solve the problem, as the practice of the invention requires efficiency, not per unit surface for a given speed maintained regardless of the power consumed but for lift and velocity per horse power applied, to the end that the load may be supported and the speed maintained with the most economical use of the power available.

Among the factors involved at high speeds is the skin and internal friction which varies directly as the surface and as the square of the velocity, thus: $R = SV^2 f$ being the coefficient of friction of the water which may be taken as .0064. The power consumed by friction varies as the cube of the velocity, thus, $$H. P. = \frac{SfV^3}{550}$$

This factor of friction is not so important at low speeds because of the smallness of the coefficient (.0064) but at high speeds it increases very rapidly and in a particular case, for a speed of about 60 miles per hour was found to consume one half the total available horse power. This consideration alone would lead to selection of the smaller areas and greater angles of inclination for the gliding planes. It is controlled, however, by the fact that excluding skin friction, the power required to drive the plane increases as the weight to be supported, as the sine of the angle and as the first power of the velocity, thus:

$$H. P. = WV \sin a.$$

As W is fixed and V is the main object of the invention, decrease of sin. $a$, that is inclination of the planes is a most attractive way of decreasing the horse power consumed in support or flotation of the load. It involves increase of area of the planes, however, and consequently of horse power consumed in friction so that the proper angle and area of plane I have discovered to be those particular areas and those particular angles for which the sum of the horse power consumed in supporting the load plus the horse power consumed in friction is a minimum. These are found to be small angles and such corresponding areas as are necessary to support the load at the various speeds to be attained.

The results are favorable where the angle of inclination is about 1 to 5 or 6 and they improve rapidly as the angle is decreased to 1:8, 1:10, 1:12, 1:14 and 1:16. The aggregate improvement is such that at the latter angle the total power necessary for speeds from 20 to 60 miles per hour is about one half that necessary to produce corresponding speeds with the 1 to 5 ratio or pitch of plane, or to put it another way, the power necessary to drive the same craft 30 miles per hour with the high angle planes will drive it 50 miles per hour with the low angle planes the area being practically the same in both cases. My invention, however, includes the feature of selecting not merely the smaller and more efficient angles but also the feature of selecting suitable angles which are not the smallest or the most economical in horse power but which are determined in part by practical considerations and are based upon the proportions of the craft and the height of the waves or swells which she is designed to navigate.

Referring now to Figs. 5 and 6 it will be seen that in the position shown, which is preferably made the rearmost position possible for the pivoted supports, the angle of the lowermost submerged planes is such with respect to the length of boat between them and the possible maximum lift of the stern and dip of the bow, that before pitching of the structure to a point where the planes will pass the horizontal position and take effect as downward wedging planes, the steep angle guard planes 56, 57 and 58 and the plane 23 of the bow will strike the surface of the water and because of the relatively great surface thus brought into play will effectually counteract the diving tendency and will restore the normal level. In the proportions shown the possible pitch is not far from 1 in 16 or 1 in 14 and as planes having a pitch of about 1 in 14 are found to require only slightly more horse power for a given speed than those of lesser angle, I prefer to make the normal pitch approximately 1 to 14 or somewhat greater, and I have designed the areas accordingly. I find that an angle of 1 to 12 is not very wasteful of power and for shorter boats or those intended for rougher water or having more deeply submerged planes and therefore a greater range of possible pitch, the 1 to 10 angle and in some cases even the 1 to 10 angle of plane may be used without too great sacrifice of efficiency. In general the smaller angle planes may be more safely used in combination with the steeper angle planes though as before explained it is not desirable that those of different angles be arranged one over the other unless indeed they be very widely separated as compared with their fore and aft dimensions. If this dimension is less than half the vertical distance between them, the effect referred to will be small. I contemplate using planes where desired whose pitch or angle is as great as 1 to 5 but preferably not for the highest speeds. The planes 56, 57 and 58 are normally at about this angle, for so arranged, they fit into several requirements.

The horse power required for the higher speeds of 40, 50 and 60 miles per hour, is ample to drive the boat at 20 miles an hour even when part of the gliding support is thus furnished by high angle energy wasting planes. In the second place they are only brought into regular play during a brief transition period from lower to normal high speed and their area may be one third less for the required lifting effect than would be required at an angle of 1 to 14 or 1 to 16. The decrease of weight, cumbersomeness and windage is an object. Finally they cannot possibly be inclined downwardly by any possible pitching. They may be located so as to strike the water either before or after the hull surfaces 23. The lowermost of them may be arranged to feather or have their angle increased to meet emergencies as shown in Figs. 7 and 8 and as previously described. The vertical rods, 80, may be connected by a balanced lever or other motion reversing connection so that as the angle of those on one side of the boat is increased that of those on the other side may be decreased or even completely reversed. By making such lever or motion reversing means vertically adjustable bodily, these planes can be manipulated to move either oppositely or together, to any desired angular pitch. Thus arranged they could be adjusted together to correct fore and aft pitching or oppositely to correct rolling as for instance when caught in seas of greater violence and height than those for which the craft is designed. Vertically pivoted laterally wedging planes can be employed for the same purpose. They may be normally submerged and may be fixed or when pivoted as described may be normally parallel and in the plane of forward movement and they may be provided with cranks, rods and motion reversing connections like 79, 80, so as to be adjustable either separately or together and in the same or opposite directions. Any of the normally submerged planes may be provided with adjusting means for the purpose of trimming ship to a normal horizontal plane.

The sets of supporting planes when in the normal position shown with the angles and areas of planes about as shown, are adapted to operate somewhat as follows: At low speeds the load is carried by the floating bodies 21, 22. As the speed increases the planes all being submerged and becoming more efficient as the square of the speed, are sufficient to entirely support the structure, by the time a speed of 18 or 20 miles an hour is reached. The hulls are gradually lifted out of the water and even at this low speed the horse power required is less than is ordinarily required in a well designed motor boat of similar dimensions or length. Moreover the support now being by the planes the device is free of the law of the cube and increase in applied power affects increase of speed in a direct ratio with the increase of power and not as the cube root thereof. At increasing speeds the structure is lifted more and more until finally it is supported by the lower planes 52, 53, the others being out of water. The surface of these latter is surprisingly small being for a 25 ft. boat 8 planes 52, 53 each about 6 by 8 inches and even less than this. At 60 miles an hour only about 3 times the horse power is required that is required at 20 miles an hour.

For various reasons it is desirable that the angle of the supports 59, 60, 63, 64, etc., and the gliding planes carried thereby be capable of change of angle to compensate for changes in load and to secure the proper angles for wide ranges of speed. To this end said supports are pivoted as previously described and they are held in desired position by a balanced system of tension members consisting of steel wire or cable. For this purpose 3 centrally pivoted rocker arms or levers are mounted on each side, fore, aft and amidships and preferably on the longitudinal piping 31, 32. Tension member 81, leads from 63 to the lower end 83 of the amidship lever to 84 the upper end of the forward lever, which is pivoted at 85. The lower end of the latter, 86, is connected by wire 87 to support 63 and 88, whence extends wire 89 leading to the upper end 93 of the amidship lever whence 92 extends to the upper end 91 of the after lever pivoted at 90. From the lower end of the latter the wire 89ª leads to point 82 on support 64. It will be readily seen that this arrangement balances all thrust either forward or backward of one set of supports 63, 64 against that of the other and in both directions. The adjustment is effected by swinging arm 94 about its pivot by pulling on wire 98 or wire 99 connected respectively to the lower end 83 and upper end 93 of said arm or lever. These wires pass around suitable guy pulleys 96, 97 and around the drum of the adjusting wheel 95 located adjacent the steering wheel 101 and preferably coaxially therewith just forward of the helmsman's seat 100. Rotary movement of the wheel 95 winds and unwinds equal lengths of 98 and 99 respectively. By this means is secured an easily adjustable perfectly balanced system.

The arrangement just described is duplicated for the opposite side of the device. The adjusting wires corresponding to 98, 99 being preferably wound about the same drum and operated by the same wheel 95. From the wheel 101 lead tiller ropes 107 around guy pulleys 110 to the tiller 106, controlling the rudder post 103 which is mounted in brackets 104, 105, and carries the balanced rudder 102. The helmsman's seat is located on a suitable platform 204 carrying the wheelpost and said platform is mounted upon transverse frame members 29, 30. Forward of this is the fuel tank 223 and space which may be utilized in various ways.

The motive power is furnished by apparatus mounted upon longitudinal steel tubes 201, 202 secured by means of hangers 222 to the transverse members 27, 28. It includes the motor 221, change of speed gearing 225, chain gear case 207, combined chain casing and downwardly extending propeller supports 121, 122 and the propeller 210. The latter devices are arranged in a manner easily understood from the drawings. The supports 121, 122 are plain faced and exactly parallel on sides adjacent each other, these sides being formed by plates supported from 27 and 202. They are completed by outer convex plates 123, 124 which act as outwardly working surfaces and are given such convexity as is necessary to permit free passage of the chain connecting the crank shaft with the propeller shaft. They are closed in on top by plates 205, 206, and 208 and casing 207. At the lower end they are rigidly secured to a gear case supporting the propeller and chain gear. This case is elongated forwardly in the shape of a cone 209 and the propeller has a similar elongation rearwardly, 212, and the whole outline of both these parts is a smooth curving surface adapted to high speed with minimum drag. The connecting chain may be a Morse or similar anti-friction roller bearing sprocket chain.

The propeller itself has special features of novelty particularly adapting it for the entirely new order of speed of movement attainable by the practise of my invention. Some of the considerations controlling design of the propeller are quite analogous to those regulating the selection of proper areas and angles for the gliding planes. Both are wedges or wedging surfaces adapted to effect displacement of the water, the total surface of the blades 211 corresponds to the area of the gliding plane and the pitch of the blade corresponds to the angle of the plane but only in an analogous way. The laws of frictional loss are identical, being in the case of the propeller proportional to the area of blades and hub the square of the velocity, and the coefficient of friction. The radius of the propeller and its area should be great for some reasons such as the economy of power where large masses of water are displaced at slow velocity as against the small masses and high velocity which are necessary to get the same thrust from a small propeller. The thrust is proportional to the area of the circle covered by the blades, the square of the velocity and the sine of the angle of the blade which as in the case of gliding planes represents the pitch.

For a catamaran such as shown, a certain definite amount of power is required to force the gliding planes forward at the desired speed and this may be determined by the formula heretofore given and equals the product of the thrust of the propeller and the velocity of the boat. At a certain velocity the thrust required equals $$\frac{\text{H. P.} \times 550}{\text{Velocity}}$$

For the boat shown a thrust of about 600 pounds is required. To produce this thrust the propeller must displace while at the required speed a column of water whose weight is equivalent to 600 pounds, that is, $$ALW = 600$$

where $A$ = the area, $L$ = the height of column, and $W$ = the weight per unit volume.

The diameter of the propeller is determined by the diameter of the column of water which it is necessary to displace and this depends upon and is determined by the permissible velocity from a static head. With the diameter and consequently the area of the circle thus determined, the percentage of surface that should be covered by the blades of a true screw propeller equals the total area times the sine of the angle of pitch, divided by two.

If the extreme diameter of the propeller is 24 inches and the diameter of the hub 6 inches, then $A$ the area equals about 3 square feet. $W$ equals the weight of water per cubic foot which is 64 pounds. This gives the permissible head $$h = \frac{600}{3 \times 64} = 3.2$$

and the corresponding velocity equals 15 feet per second. To displace the water rearwardly 15 feet per second requires a velocity of the propeller equal to that of the boat in cutting its way as a true screw without slip plus such velocity as is necessary to give the additional 15 feet per second. At 60 miles an hour the boat is moving forward at a velocity of 88 feet per second, therefore the forward velocity of the propeller merely cutting its way as a true screw must be 88 feet per second plus the 15 feet additional necessary to move the column rearwardly at that rate. Thus for the purpose in view, the pitch and velocity of the screw must be sufficient to carry it through a distance of 103 feet per second. With the propeller turning a thousand revolutions per minute, the speed will be equal to 104.6 feet per second. Since the circumferential velocity of 104.6 is practically equal to the forward velocity of the propeller acting as screw, namely 103 feet per second, it follows that the angle of pitch should be about 1 to 1. The pitch being about 1 to 1 and the total area of the 24 inch circle being about 3 square feet, the width of the blade may be determined as follows: In calculating the area of the propeller it was assumed that the thrust be equivalent to a column of water generated by the surface of the propeller and moving with a velocity $= V \sin a$. This will give us $$T = \frac{SV^2(\sin a)^2 X}{2}$$

where $T$=thrust; $S$=the area of the circle whose radius is that of the propeller; $V \sin a$=forward velocity and $X$=density of the medium.

It was shown previously that the thrust on a plane inclined at angle $a$ and moving with a velocity $V$ is $$S^1 V^2 \sin aX.$$

Hence $S^1$ the surface required will be only a certain percentage of the total area of the circle. By equating these equations it will be seen that $$S^1 = \frac{S \sin a}{2}$$

Since in this case the angle of pitch is about 1 to 1 the $\sin a = .7$. Substituting these values in the preceding equation gives $$S^1 = .35 S = .35 \times 3 = 1.05 \text{ sq. ft.}$$

The aggregate width of all the blades at the circumference is therefore $$6.28 \times .35 = 2.2 \text{ feet.}$$

If there are four blades, then this width divided by four, the number of blades, gives 6.6 inches as the width of each blade at the circumference.

Such arrangement as I have described gives a speed of over 60 miles an hour to the boat with a consumption of considerably less than a 100 horse power available in the motor.

In connection with the balanced system of tension members whereby the gliding plane supports are held balanced in any desired position of angular adjustment care must be taken to take up lost motion and care must be taken also in adjusting the length of each tension member so that the proper amount of support will be afforded by each set of planes for otherwise the support being unequal the platform will not travel in a horizontal plane. To serve these practical purposes the tension members are preferably arranged as nearly as possible in a single plane as shown in the drawing and it will be obvious that by the use of turnbuckles or similar graduated adjusting means for each tension member it will be possible both to take up lost motion and to spring any one of the sets of planes slightly forward or aft to secure the desired equality of support and the proper trim of the craft. When once adjusted relatively to each other in this way all planes may of course be further adjusted by simultaneous equal movements imparted by the wheel under control of the helmsman.

I prefer to have the propeller located well forward and near the transverse section containing the forward set of supporting planes, as indicated in Fig. 5 so that the craft is as it were pulled through or over the water rather than pushed. The location of the propelling means is, however, capable of great variation and while there are certain advantages in the particular arrangement shown I am not limited to such arrangement. Where the propeller works in the water, however, it is preferable to locate it so that it will be at all times below the surface of the water and for this reason I have arranged it at a depth greater than that of the lowermost of the submerged planes. The propeller may be located forward of the support 121 and there are certain advantages in so locating it. The strain of thrust of the propeller on 121 may be relieved by tension members secured to the same and extending aft to a suitable point on the platform structure.

I claim:—

1. A craft comprising a hull or displacement body and several horizontally distributed gliding supports adapted to support said body above the surface of the water at a predetermined speed, each support comprising a plurality of surfaces arranged at different vertical levels, certain of the surfaces at the lower levels being of such angle and area as to support somewhat less than the entire weight of the structure at the maximum speed and certain of the surfaces at the higher levels being inclined at a greater angle.

2. A craft of the class described comprising a hull in combination with normally submerged plates inclined at an angle to the plane of movement less than 8 to 1 and other planes separate therefrom and inclined at a greater angle.

3. A craft comprising a hull and separate gliding planes having a normal inclination to the plane of movement not less than 1 to 12 or more than 1 to 8, and of such corresponding area as to support substantially the entire weight of the craft when driven at normal high speed in combination with other planes at a higher level having a greater angle of inclination.

4. A high speed motor craft comprising a hull in combination with gliding plates, one above the other, parallel with each other and other gliding surfaces arranged at a different angle to said first mentioned plates.

5. A high speed motor craft comprising a hull in combination with gliding plates, one above the other, parallel with each other and other gliding surfaces arranged out of vertical alinement with and at a different angle to said first mentioned plates.

6. A high speed motor craft comprising a hull in combination with gliding plates, one above the other, parallel with each other and other gliding surfaces arranged at a greater angle than said first mentioned plates.

7. A high speed motor craft, in combination with gliding plates and pivotally mounted downwardly extending supports for said plates, means for adjusting said supports to vary the inclination of said plates, and means for counterbalancing the rearward thrust on one support against the rearward thrust on another support.

8. A high speed motor craft in combination with a plurality of adjustable gliding plates and means for balancing the rearward pressure of one or more of said plates against the rearward pressure of others of said plates.

9. A high speed motor craft in combination with downwardly extending pivoted supports arranged forward and aft, gliding plates carried thereby, and a system of tension members for counterbalancing the rearward thrust of one support by the rearward thrust upon the other.

10. A high speed motor craft in combination with substantially parallel downwardly extending pivoted supports carrying gliding plates and a system of tension members for counterbalancing the thrust of one set of supports against that of the other and means for adjusting said supports and tension members.

11. A high speed motor craft constructed and arranged for gliding support at high speed, in combination with a high speed explosive motor, a propeller, and a multiplying connection between said motor and propeller.

12. A high speed motor craft constructed and arranged for gliding support at high speed, in combination with a high speed explosive motor, a high pitch propeller, and a multiplying connection between said motor and propeller.

13. In a high speed motor craft designed to change the location of the propeller with respect to the surface of the water when moving at high speeds, the combination with the hull thereof, of a deeply submerged propeller and a motor having its shaft axis above and substantially parallel with the axis of the propeller in combination with suitable connecting transmission gearing.

14. A high speed motor craft comprising a hull, gliding planes adapted to support the entire weight of the craft at predetermined speed in combination with a propeller arranged to act upon the water forward of the center of resistance.

15. A high speed motor craft comprising a hull and inclined gliding plates in combination with a propeller arranged to act upon the water in or near the vertical transverse plane of the foremost of said plates.

16. A catamaran structure provided with several sets of gliding planes in combination with a high speed explosive motor with a substantially horizontal driving shaft, transmission gear extending downwardly from said shaft forward of said motor, a deeply submerged propeller having a substantially horizontal axis and operatively connected with the latter.

17. A high speed motor craft comprising a hull and motor upon said hull, together with a deeply submerged propeller having an independent axis, in combination with an oil case supporting the latter and containing transmission gear connecting said motor and propeller.

18. A high speed motor craft comprising a hull in combination with gliding plates, and other gliding surfaces arranged out of vertical alinement with and at a different angle to said first mentioned plates.

19. A high speed motor craft comprising a hull in combination with gliding plates, and other gliding surfaces arranged at a greater angle than said first mentioned plates.

Signed at New York city, in the county of New York, and State of New York 1905.

PETER COOPER HEWITT.

Witnesses:
MARY AGNES NELSON,
G. C. DEAN.